United States Patent [19]

Blake

[11] Patent Number: 4,468,061
[45] Date of Patent: Aug. 28, 1984

[54] HORSE VAN

[76] Inventor: Dale E. Blake, P.O. Box 57, Star, Id. 83639

[21] Appl. No.: 379,501

[22] Filed: May 18, 1982

[51] Int. Cl.³ .............................................. B60P 3/04
[52] U.S. Cl. .................................. 296/24 C; 296/181; 119/7
[58] Field of Search ...................... 105/355, 404, 409; 119/7, 11, 20; 296/24 C, 24 R, 12-14, 26, 37.6, 181, 183, 1 S

[56] References Cited

U.S. PATENT DOCUMENTS

| 371,928 | 10/1887 | Davis | 119/11 |
| 838,301 | 12/1906 | Campbell | 119/20 |
| 2,883,233 | 4/1959 | Beckley | 296/181 |
| 3,339,499 | 9/1967 | Charles et al. | 105/409 |
| 3,345,104 | 10/1967 | Mlicki | 119/11 |
| 3,574,388 | 4/1971 | Stone | 296/24 C |
| 3,815,948 | 6/1974 | Alford | 296/1 S |

FOREIGN PATENT DOCUMENTS

| 2520828 | 11/1976 | Fed. Rep. of Germany | 296/24 C |
| 2622775 | 12/1976 | Fed. Rep. of Germany | 296/26 |

Primary Examiner—Robert R. Song
Assistant Examiner—Dennis H. Pedder
Attorney, Agent, or Firm—Scrivener, Clarke, Scrivener and Johnson

[57] ABSTRACT

The invention provides a van for transporting horses which has fixed side walls which are outwardly bowed longitudinally of the length of the van.

1 Claim, 5 Drawing Figures

HORSE VAN

SUMMARY OF THE INVENTION

A van for transporting live animals such as horses has two transversely spaced fixed side walls each of which has an outwardly displaced part at such a height above the floor of the van that greater transverse width is provided within the van at the area of the head and rump of horses which are positioned transversely of the van.

DESCRIPTION OF THE INVENTION

By this invention I have provided a van for the transportation of live animals, such as horses, having side walls which are outwardly bowed intermediate the vertical height of the van, thereby to provide greater interior space at the area of the head and rump of horses positioned transversely of the van, where such additional space is most advantageous.

Figure 1:
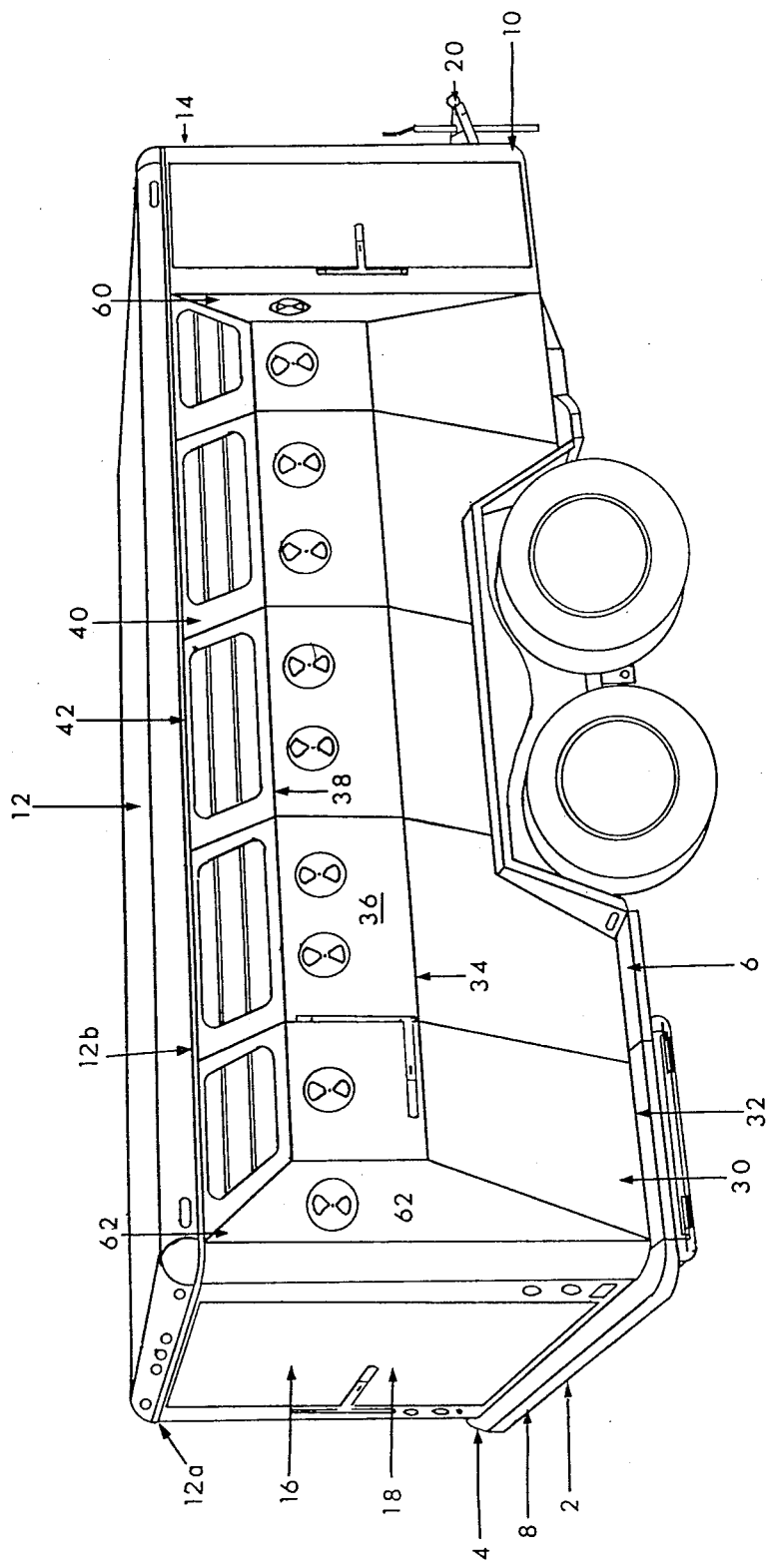
FIG. 1 is a perspective view of the right side of a tow-pull horse van trailer according to the invention.
Figure 2:
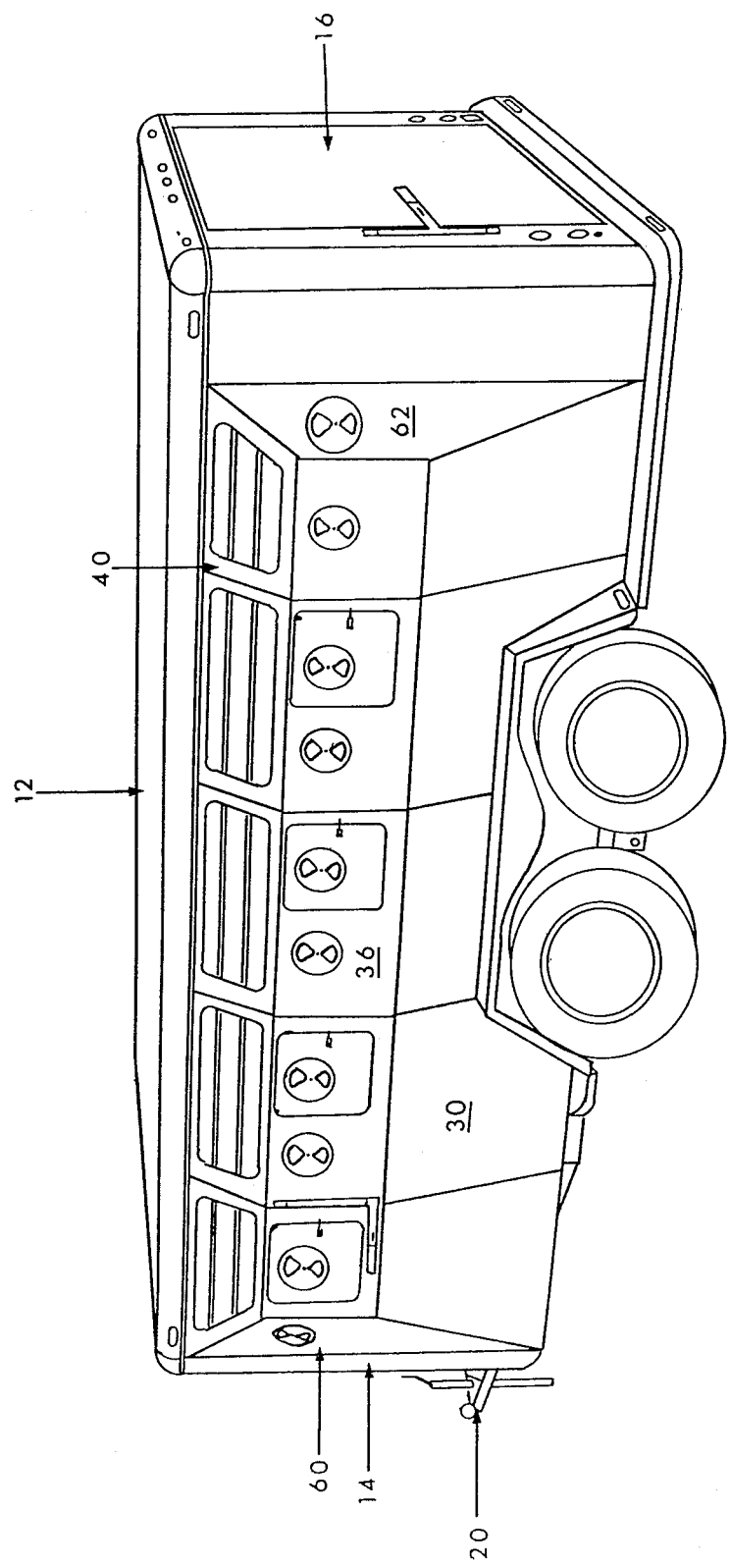
FIG. 2 is similar to FIG. 1 but shows the left side of the van.

A preferred embodiment of the invention is disclosed in the drawings and, with reference particularly to FIGS. 1 and 2, the van disclosed comprises a lower rectangular frame 2 having spaced side edges 4, 6 and spaced end edges 8, 10 on which a floor is supported. A roof 12 which is positioned above the floor at a suitable height to permit standing horses to be received within the van and has side edges 12a and 12b. Front and rear end walls 14, 16 are provided and may have any required or necessary doors such as that shown at 18. Suitable means such as that shown at 20 may be provided for towing the van.

The van has fixed spaced side walls, and in accordance with the invention each side wall is outwardly bowed at an area intermediate the floor and roof of the van and extending longitudinally of the body of the van substantially from end to end. In the preferred embodiment disclosed in this specification, each side wall comprises, first, a lower panel 30 which has a lower edge 32 which extends along the outer edge of the floor from end to end of the floor and is connected thereto by any suitable means. This lower panel extends angularly outwardly from its lower edge and terminates in an upper edge 34 which extends longitudinally of the van. Above this there is provided an intermediate panel 36 the lower edge of which is connected to the upper edge 34 of the lower panel and which extends preferable vertically upwardly from edge 34 for a short distance which is not sufficient to cause this intermediate panel to extend to the roof. The upper edge 38 of intermediate panel 36 is connected along its length to the lower edge of an upper panel 40 which extends longitudinally of the van and which is inclined inwardly from the edge 38 and has its upper edge 42 connected to the adjacent longitudinal edge of the roof.

Figure 3:
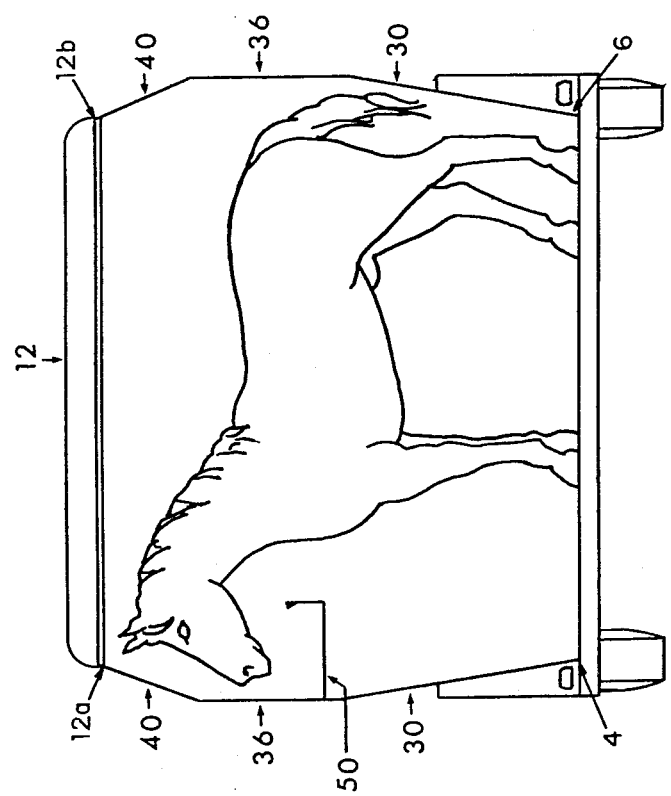
FIG. 3 is a vertical sectional view through the trailer shown in FIGS. 1 and 2.
Figure 4:
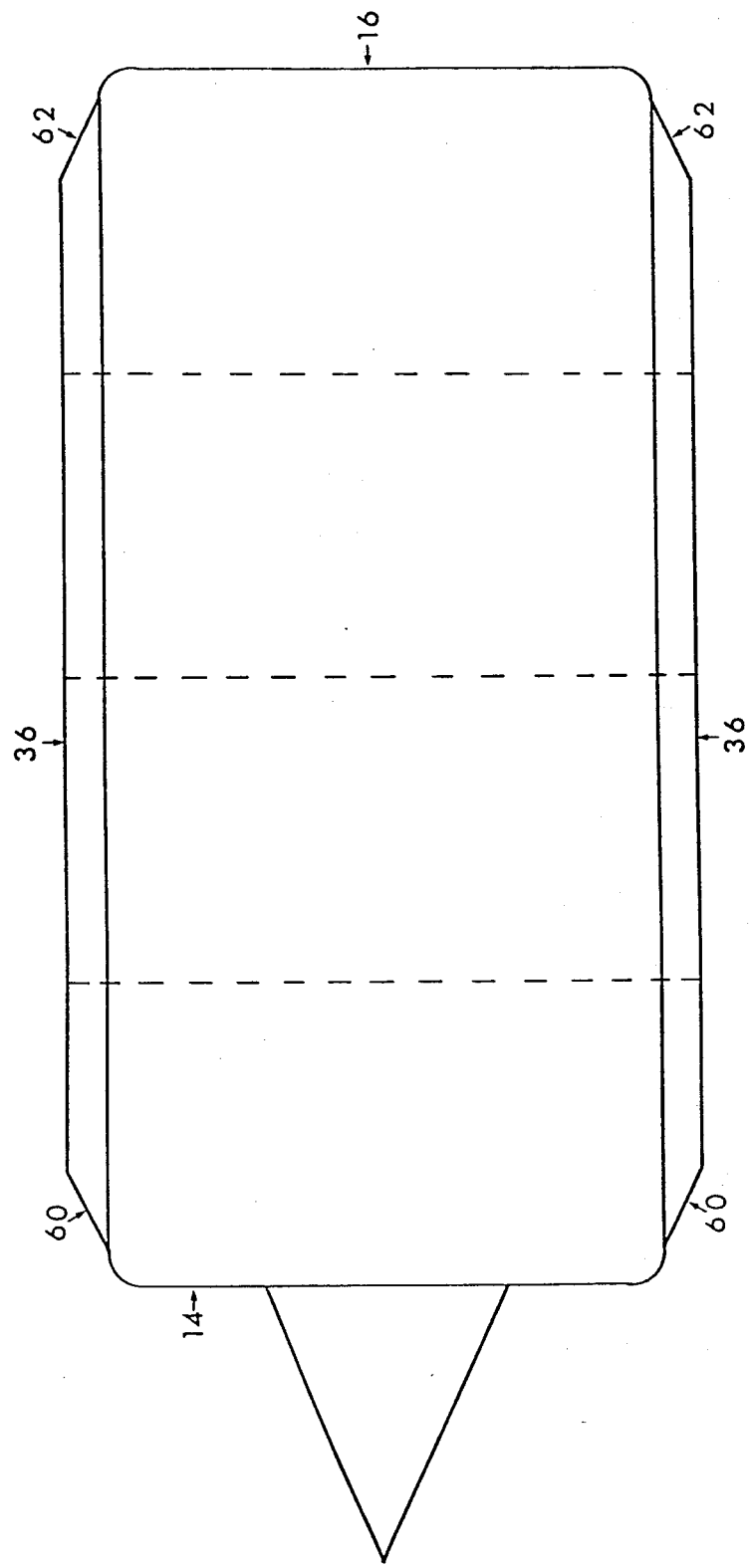
FIG. 4 is a horizontal sectional view of the body of the trailer shown in FIGS. 1 and 2.

Each of the two outwardly bowed side walls is rigid and fixed and is not expansible. The two walls are best shown in the cross section of the trailer van in FIG. 3 and it will be seen that because of the outward bow of the side walls additional transverse space is provided within the van at the area of the head and rump of a standing horse positioned transversely of the van. A feeding trough 50 may be provided within the van at the area of increased width as shown in FIG. 3.

In the preferred embodiment of the invention the lower edge 32 of the lower panel 30 and the upper edge 42 of the upper panel 40 extend to the ends of the trailer, but the intermediate panel 36 does not extend entirely to the front or rear of the van. Because of this relation of the ends of the three panels on each side and at each end of the trailer there is provided at the front end a vertical forwardly inclined panel 60 and at the rear end a vertical rearwardly inclined panel 62, both of which are trapezoidal shape and each of which is inclined longitudinally of the van. Thus, there are provided at the forward or leading edge of the van two inclined side walls 60 which reduce air resistance as the trailer moves forwardly, and at both sides of the trailing or rear end of the trailer there is provided on each side a similar inclined surface which reduces the vacuum produced as the trailer moves forwardly.

In the preferred embodiment of the invention which has been described, and which is disclosed in FIGS. 1 to 4 the forward and rear ends of the panels 30, 36, 40 are aligned transversely of the van and therefore corresponding parts of the two side walls are opposite each other.

Figure 5:
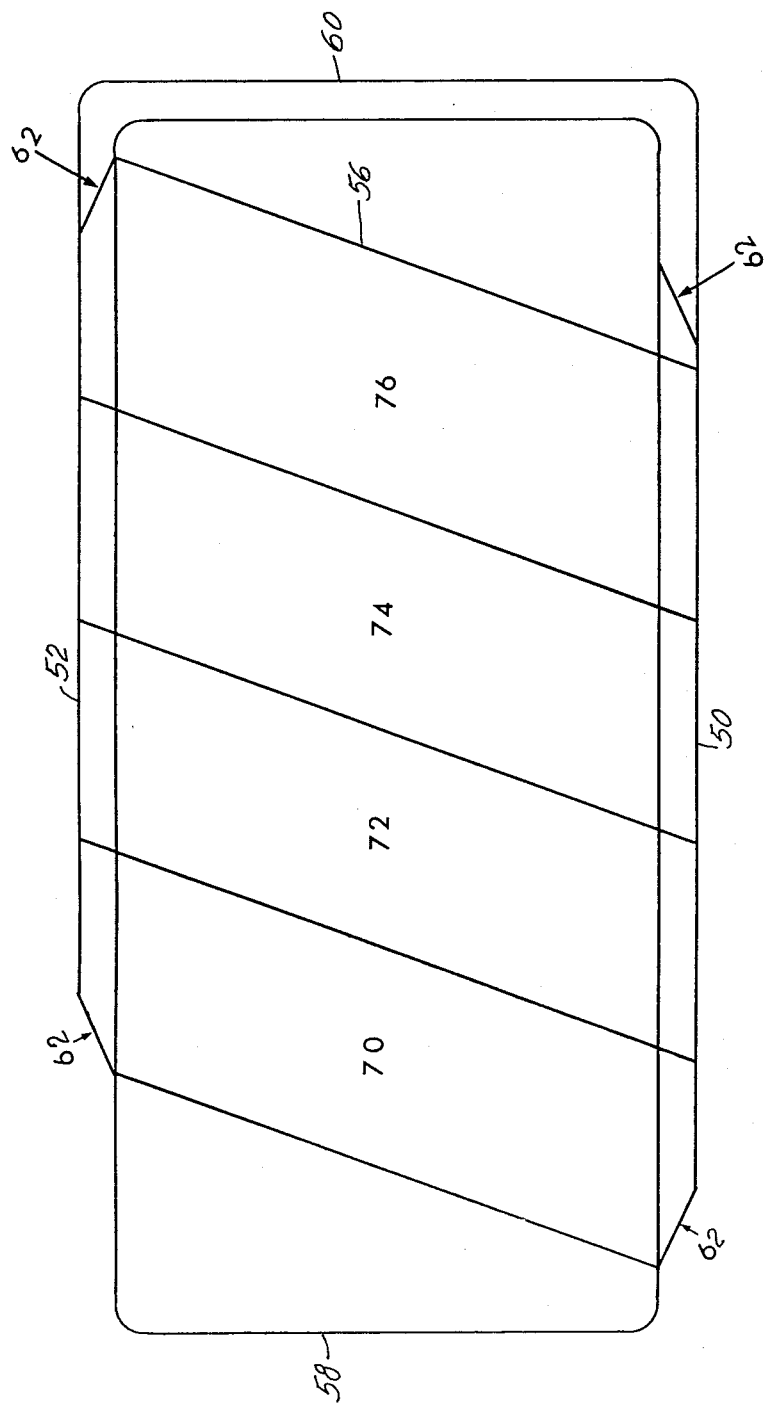
FIG. 5 is a horizontal sectional view of the body of a second embodiment of the invention.

In another embodiment of the invention, which is shown in FIG. 5, the side panels of the van are bowed outwardly beyond their upper and lower longitudinal edges at the level of the head and rump of a horse, as heretofore described, and the stalls 70, 72, 74, 76 are positioned angularly across the van thus further increasing the length of the stalls. Further, in this embodiment the outwardly bowed area of one side wall is displaced rearwardly of the outwardly bowed area of the other side wall to accomodate and facilitate the angular positions of the stalls.

Because of the expanded width of the trailer at the area where it is needed, at the location of the head and rump of the horse, the floor of the trailer may be reduced in width below that normally required, resulting in a saving of material and consequent reduction in weight and fuel requirements.

The van may be a trailer of any type such as tongue-pull or gooseneck, or the invention may be utilized in a self-driven van, and the word "van" in this specification and the claims is to be understood to have this broad meaning.

While the description of the invention has been directed particularly to outwardly bowed side walls formed by longitudinally extending angularly related panels, the invention may be practiced by outwardly curving the side walls to produce the area of maximum internal width at the area of the head and rump of the horses. It will also be understood that the described panels may be formed separately or from one sheet of material.

I claim:

1. A wheeled van for carrying standing live animals such as horses which are positioned transversely of the van, comprising a body comprising a floor and a roof having side edges, end walls and side walls, each side wall being constructed to provide a transverse section of increased interior width at the level of the head and rump of a standing horse within the van and a lower panel extending longitudinally of the body with its lower edge at the side edge of the floor and extending angularly outwardly and upwardly from its lower edge with its upper edge approximately at the midpoint of the height of the body, an intermediate panel extending vertically upwardly from the upper edge of the lower panel and having an upper edge, an upper panel extending angularly upwardly and inwardly from the upper edge of the intermediate panel to the side edge of the roof, and a vertical panel at each end of each side of the van which extends angularly from the lower, intermediate and upper panels to the adjacent end of the body.

* * * * *